United States Patent [19]

Okamoto

[11] Patent Number: 4,616,446

[45] Date of Patent: Oct. 14, 1986

[54] CONSTRUCTION OF DOOR GLASS RUNS IN MOTOR VEHICLE

[75] Inventor: Yuji Okamoto, Toyota, Japan

[73] Assignee: Toyota Jidosha Kabushiki Kaisha, Japan

[21] Appl. No.: 766,010

[22] Filed: Aug. 15, 1985

[30] Foreign Application Priority Data

Aug. 21, 1984 [JP] Japan .......................... 59-126869[U]

[51] Int. Cl.⁴ .............................................. E06B 7/16
[52] U.S. Cl. ....................................... 49/441; 49/374; 49/479; 49/488
[58] Field of Search ................. 49/441, 374, 375, 489, 49/488, 440, 479

[56] References Cited

U.S. PATENT DOCUMENTS

| | | | |
|---|---|---|---|
| 2,024,773 | 12/1935 | Lohrman | 296/48 |
| 4,409,756 | 10/1983 | Audenino et al. | 49/440 |
| 4,457,111 | 7/1984 | Koike | 49/441 |
| 4,490,942 | 1/1985 | Arnheim et al. | 49/440 X |

*Primary Examiner*—Philip C. Kannan

*Attorney, Agent, or Firm*—Finnegan, Henderson, Farabow, Garrett & Dunner

[57] ABSTRACT

Construction of door glass runs in a motor vehicle, wherein: there are provided vertical side glass runs and a top side glass run, which are secured to vertical sides and a top side of a door frame, respectively, in vehicle door with the door frame; the vertical side glass runs slidably guide a forward end sliding portion of a slider in the opening or closing direction of a door glass and restrain the forward end sliding portion in the direction of thickness of the door glass, the slider is mounted to end edges of the door glass in the longitudinal direction thereof, and, has the forward end sliding portion shifted into a compartment and being of a crank shape in cross section; and the top side glass run has an inner lip for contracting the inner surface of a top end edge of the door glass to seal when the door glass is fully closed; the inner lip in the top side glass run is decreased in cross section thereof toward the vertical side glass runs within a range of contacting the slider when the door glass is fully closed, made gradually thinner at the distal ends thereof in wall thickness than the other general portion thereof and thicker at the proximal ends thereof in wall thickness than the other general portion thereof.

8 Claims, 4 Drawing Figures

CONSTRUCTION OF DOOR GLASS RUNS IN MOTOR VEHICLE

BACKGROUND OF THE INVENTION

1. Field of the Invention

This invention relates to construction of door glass runs in a motor vehicle, and more particularly, to improvements in construction of glass runs in a motor vehicle, wherein a door glass is guided through sliders, the forward end sliding portions of which are secured to end edges of a door glass in the longitudinal direction thereof in the motor vehicle and shifted into a compartment.

2. Description of the Related Art

Door glasses are subjected to a force sucking the door glasses outwardly due to a difference in pressure between the interior and the exterior of a compartment during running of a motor vehicle at high speed.

To restrain the door glass in the direction of the thickness thereof to control an outward displacement of the door glass during running at high speed, end edges of the door glass in the longitudinal direction thereof are guided by door glass guides being U-shaped in cross section.

Here, such disadvantages are presented that the outer side portion of the door glass guide should necessarily be protruded outwardly from the outer surface of the door glass to increase air resistance during running of the motor vehicle at high speed and a so-called wind whistle is increased.

To obviate the above-described disadvantages, as disclosed in U.S. Pat. No. 2,024,773 for example, there has been proposed such construction that sliders being generally crank-shaped in cross section are secured to the end edges of the door glass in the longitudinal direction, and the forward end of the slider shifted into the compartment of the slider is guided in the vertical direction by guides provided on the door frame.

In this case, the outer surfaces of the door frame and of the door frame can be made generally flush with each other.

Here, as shown in FIG. 3, a glass run 1 constituting the door glass guide has a vertical side glass run 1A and a top side glass run 1B, which are secured to vertical sides and a top side of the door frame.

The vertical side glass run 1A has an inner lip 5A and an outer lip 5B, which come into a contact with a foward end sliding portion 4A of a slider 4 being generally crank-shaped in cross section, which is secured to an end edge 3A of a door glass 3 in the longitudinal direction thereof.

On the other hand, the top side glass run 1B is not required to guide the door glass 3, but required only to have a function of contacting the top end edge 3B to seal a space between the door glass 3 and the top side of a door frame when the door glass 3 is fully closed. Consequently, in general, the top side glass run 1B has an outer lip 6B to be clamped between the top end edge 3B of the door glass 3 and the top side of the door frame 60 and an inner lip 6A coming into contact with the inner surface of the top end edge 3B of the door glass 3, when the door glass 3 is fully closed.

In the above-described top side glass run 1B, if the inner lip 6A would be decreased at the distal end thereof in wall thickness, then wave-shaped deformations would be generated at the distal end of the inner lip 6A, during production or assembling to the door frame. Hence, as shown in FIG. 3, the distal end of the inner lip 6A is made thicker in wall thickness than the other portion.

Furthermore, as shown in FIG. 3, the inner lip 6A is formed into a continuously similar cross section and has a gradually decreased cross sectional area toward the vertical side glass run 1B in a manner to be smoothly connected to the inner lip 5A in the vertical side glass run 1A and not interfere with the slider 4 within a range X, in which the slider 4 comes into contact with the door glass 3 when the door glass 3 is fully closed.

However, the top side glass run 1B provided with the inner lip 6A having the above-described construction cannot follow the configurations of the door glass 3 and the slider 4 in a portion ranging from the door glass 3 to the slider 4 when the door glass is fully closed, whereby a triangular gap 7 is formed between the door glass 3, the slider 4 and the inner lip 6A as shown in FIG. 4, so that the sealing function is deteriotated.

SUMMARY OF THE INVENTION

It is therefore the primary object of the present invention to provide a construction of door glass runs in a motor vehicle, wherein a triangular gap is eliminated from a portion ranging from the door glass to the slider as defined between the door glass, the slider and the inner lip of the top side glass run when the door glass is fully closed.

To this end, the present invention contemplates that, in construction of door glass runs in a motor vehicle, wherein: there are provided vertical side glass runs and a top side glass run, which are secured to vertical sides and a top side of a door frame, respectively, in a vehicle door with the door frame; the vertical side glass runs slidably guide a forward end sliding portion of a slider in the opening or closing direction of a door glass and restrain the forward end sliding portion in the direction of thickness of said door glass, said slider is mounted to end edges of the door glass in the longitudinal direction thereof, and, has said forward end sliding portion shifted into a compartment and being of a crank shape in cross section; and said top side glass run has an inner lip for contacting the inner surface of a top end edge of the door glass to seal when the door glass is fully closed; the inner lip in the top side glass run is decreased in cross section toward the vertical side glass runs within a range of contacting the slider when the door glass is fully closed, made gradually thinner at the distal ends thereof in wall thickness than the other general portion thereof and thicker at the proximal ends thereof in wall thickness than the other general portion thereof.

To the above end, the present invention contemplates that said inner lip tapered at the distal ends thereof.

To the above end, the present invention contemplates that the top side glass run has an outer lip to be clamped between the top end edges of the door glass and the slider and the top side of the door frame when the door glass is fully closed.

To the above end, the present invention contemplates that the vertical side glass run has an inner lip and an outer lip for contacting the inner surface and the outer surface of the forward end sliding portion, respectively, the inner lip of the vertical side glass run and the inner lip of the top side glass run are formed smoothly continuous each other at a corner portion of the door frame.

According to the present invention, the distal end of the inner lip of the top side glass run, at a portion contacting the slider when the door glass is fully closed is thinner in wall thickness than the other general portion and the proximal end of the inner lip is thicker in wall thickness than the other general portion, so that the inner lip can follow the surfaces of the door glass to the slider when the door glass is fully closed.

DETAILED DESCRIPTION OF THE PREFERRED EMBODIMENT

Description will hereunder be given of one embodiment of the present invention with reference to the drawings.

Figure 1:
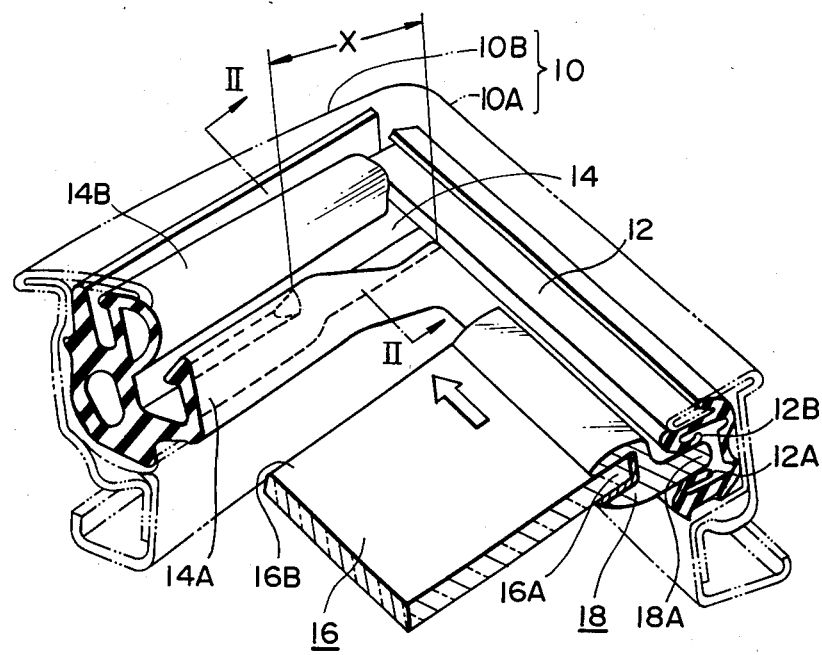
FIG. 1 is a partially sectional perspective view showing an embodiment of construction of the door glass runs in motor vehicle according to the present invention.
Figure 2:
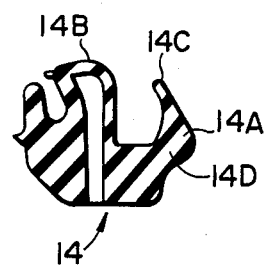
FIG. 2 is a sectional view taken along the line II—II in FIG. 1.
Figure 3:
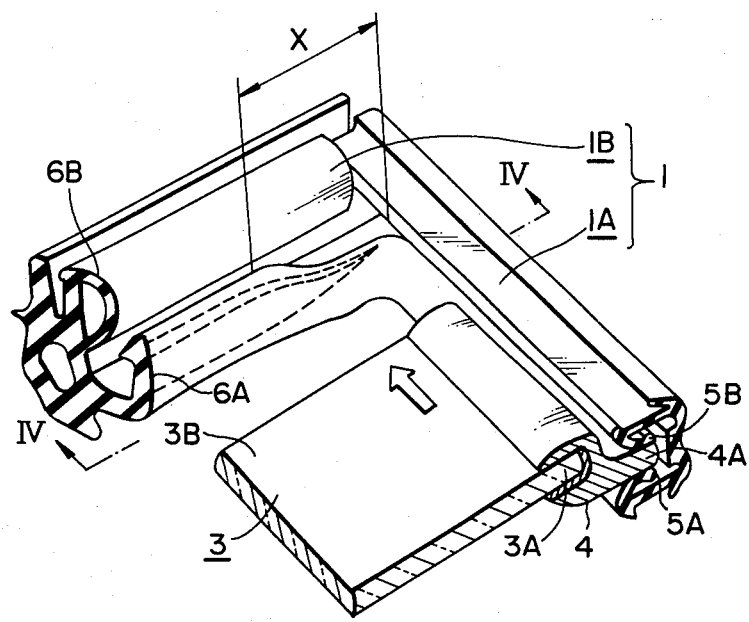
FIG. 3 is a perspective view similar to FIG. 1, showing the construction of the door glass runs in the conventional motor vehicle.
Figure 4:
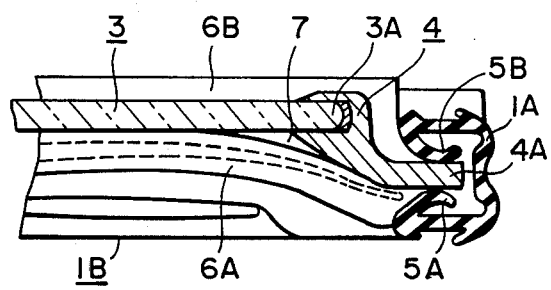
FIG. 4 is a sectional view taken along the line IV—IV in FIG. 3 when the door glass is fully closed.

As shown in FIGS. 1 and 2, according to this embodiment, in a door glass runs 11 in a motor vehicle, wherein: there are provided vertical side glass runs 12 and a top side glass run 14, which are secured to vertical sides 10A and a top side 10B of a door frame 10, respectively, in a vehicle door, not shown, with the door frame 10; the vertical side glass runs 12 slidably guide a forward end sliding portion 18A in a slider 18 in the opening or closing direction of a door glass 16 and restrain the forward end sliding portion 18A in the direction of thickness of the door glass 16, the slider is mounted to end edges 16A of the door glass 16 in the longitudinal direction thereof, and, has the forward end sliding portion 18A shifted into a compartment and being of a crank shape in cross section; and the top side glass run 14 has an inner lip 14A for contacting the inner surface of a top end edge 16B of the door glass 16 to seal when the door glass 16 is fully closed; the inner lip 14A in the top side glass run 14 is decreased in cross section thereof toward the vertical side glass runs 12 within a range X of contacting the slider 18 when the door glass 16 is fully closed, made gradually thinner at the distal ends 14C thereof in wall thickness than the other general portion thereof and thicker at the proximal ends 14D thereof in wall thickness than the other general portion thereof (Refer to FIG. 2).

The inner lip 14 is tapered at the distal ends 14C thereof, and the sectional shape of the general portion is shown at the left end in FIG. 1.

The vertical side glass run 12 has an inner lip 12A and an outer lip 12B for contacting the inner surface and the outer surface of the forward end sliding portion 18A, respectively, the inner lip 12A of the vertical side glass run 12 and the inner lip 14A of the top side glass run 14 are formed smoothly continuous each other at a corner portion of the door frame 10.

Designated at 14B is an outer lip in the top side glass run 14. The outer lip 14B is clamped between the top end edges of the door glass 16 and the slider 18 and the top side 10B of the door frame when the door glass 16 is fully closed.

In this embodiment, the sectional shape of the outer lip 14B of the top side glass run 14 is gradually decreased in sectional area toward the vertical side glass runs 12 within a range X of contacting the slider 18 and the distal end of the inner lip 14A is decreased in wall thickness, whereby the outer lip 14A can satisfactorily follow and contact surface of the door glass 16 and the slider 18 contiguous thereto, so that the sealing performance of the glass run at a corner portion where the vertical side glass run 12 is connected to the top side glass run 14 is improved.

Further, as the inner lip 14A is thicker at the proximal end 14A thereof in wall thickness than the other general portion thereof, wave-shaped deformations would not be generated at distal end 14C of the inner lip 14A, during production or assembling to the door frame 10.

What is claimed is:

1. Construction of door glass runs in a motor vehicle, wherein: there are provided vertical side glass runs and a top side glass run, which are secured to vertical sides and a top side of a door frame, respectively, in vehicle door with said door frame; said vertical side glass runs slidably guide a forward end sliding portion of a slider in the opening or closing direction of a door glass and restrain the forward end sliding portion in the direction of thickness of said door glass, said slider is mounted to end edges of the door glass in the longitudinal direction thereof, and, has said forward end sliding portion shifted into a compartemnt and being of a crank shape in cross section; and said top side glass run has an inner lip for contacting the inner surface of a top end edge of said door glass to seal when said door glass is fully closed; characterized in that said inner lip in said top side glass run is decreased in cross section thereof toward said vertical side glass runs within a range of contacting said slider when said door glass is fully closed, made gradually thinner at the distal ends thereof in wall thickness than the other general portion thereof and thicker at the proximal ends thereof in wall thickness than the other general portion thereof.

2. Construction of door glass runs in a motor vehicle as set forth in claim 1, wherein said inner lip is tapered at the distal ends thereof.

3. Construction of door glass runs in a motor vehicle as set forth in claim 1, wherein the top side glass run has an outer lip to be clamped between the top end edges of the door glass and the slider and the top side of the door frame when the door glass is fully closed.

4. Construction of door glass runs in a motor vehicle as set forth in claim 2, wherein the top side glass run has an outer lip to be clamped between the top end edges of the door glass and the slider and the top side of the door frame when the door glass is fully closed.

5. Construction of door glass runs in a motor vehicle as set forth in claim 1, wherein the vertical side glass run has an inner lip and an outer lip for contacting the inner surface and the outer surface of the forward end sliding portion, respectively, the inner lip of the vertical side glass run and the inner lip of the top side glass run are formed smoothly continuous each other at a corner portion of the door frame.

6. Construction of door glass runs in a motor vehicle as set forth in claim 2, wherein the vertical side glass run has an inner lip and an outer lip for contacting the inner surface and the outer surface of the forward end sliding portion, respectively, the inner lip of the vertical side glass run and the inner lip of the top side glass run are formed smoothly continuous each other at a corner portion of the door frame.

7. Construction of door glass runs in a motor vehicle as set forth in claim 3, wherein the vertical side glass run has an inner lip and an outer lip for contacting the inner surface and the outer surface of the forward end sliding portion, respectively, the inner lip of the vertical side glass run and the inner lip of the top side glass run are formed smoothly continuous each other at a corner portion of the door frame.

8. Construction of door glass runs in a motor vehicle as set forth in claim 4, wherein the vertical side glass run has an inner lip and an outer lip for contacting the inner surface and the outer surface of the forward end sliding portion, respectively, the inner lip of the vertical side glass run and the inner lip of the top side glass run are formed smoothly continuous each other at a corner portion of the door frame.

* * * * *